(12) United States Patent  
Egnor

(10) Patent No.: US 7,581,623 B1
(45) Date of Patent: Sep. 1, 2009

(54) STOP FOR EQUIPMENT POSITIONING

(76) Inventor: John M. Egnor, 311 Knollwood Dr., Egg Harbor Township, NJ (US) 08234

( * ) Notice: Subject to any disclaimer, the term of this patent is extended or adjusted under 35 U.S.C. 154(b) by 1684 days.

(21) Appl. No.: 08/828,560

(22) Filed: Mar. 31, 1997

(51) Int. Cl.
B61H 13/00 (2006.01)
(52) U.S. Cl. .......................................... 188/36; 188/32
(58) Field of Classification Search ................... 188/32, 188/5, 36
See application file for complete search history.

(56) References Cited

U.S. PATENT DOCUMENTS

| 2,007,514 A | * | 7/1935 | Wilson et al. | ................. | 188/32 |
| 2,441,627 A | * | 5/1948 | Gregg | ......................... | 188/32 |
| 2,870,872 A | * | 1/1959 | Rapp | ........................... | 188/32 |
| 3,297,111 A | * | 1/1967 | Lisboa | ........................ | 188/32 |
| 3,391,760 A | * | 7/1968 | Gonser | ........................ | 188/32 |
| 4,314,735 A | * | 2/1982 | Fullenkamp et al. | ........ | 439/152 |
| 4,711,325 A | * | 12/1987 | Mountz | ....................... | 188/32 |
| 5,427,209 A | * | 6/1995 | Tannehill et al. | .............. | 188/32 |

* cited by examiner

Primary Examiner—Bradley T King
(74) Attorney, Agent, or Firm—Bacon & Thomas, PLLC

(57) ABSTRACT

A method for fixedly positioning commercial kitchen equipment is provided. A ramped stop comprises a body having an upstanding front ramp portion having opposing forwardly and rearwardly sloping surfaces for the passage of a wheel therealong, a rear ramp portion extending rearwardly from the rearwardly sloping surface. The rear ramp portion being of a height at least as great as the front ramp portion. A wheel receiving portion positioned between the front ramp portion and the rear ramp portion and interconnecting the front and rear ramp portions. Lateral wheel support elements attached to the body of the stop on the bottom floor of the stop and extending the length of the stop. A plurality of securing holes in the bottom floor of the stop.

5 Claims, 3 Drawing Sheets

Figure 1:
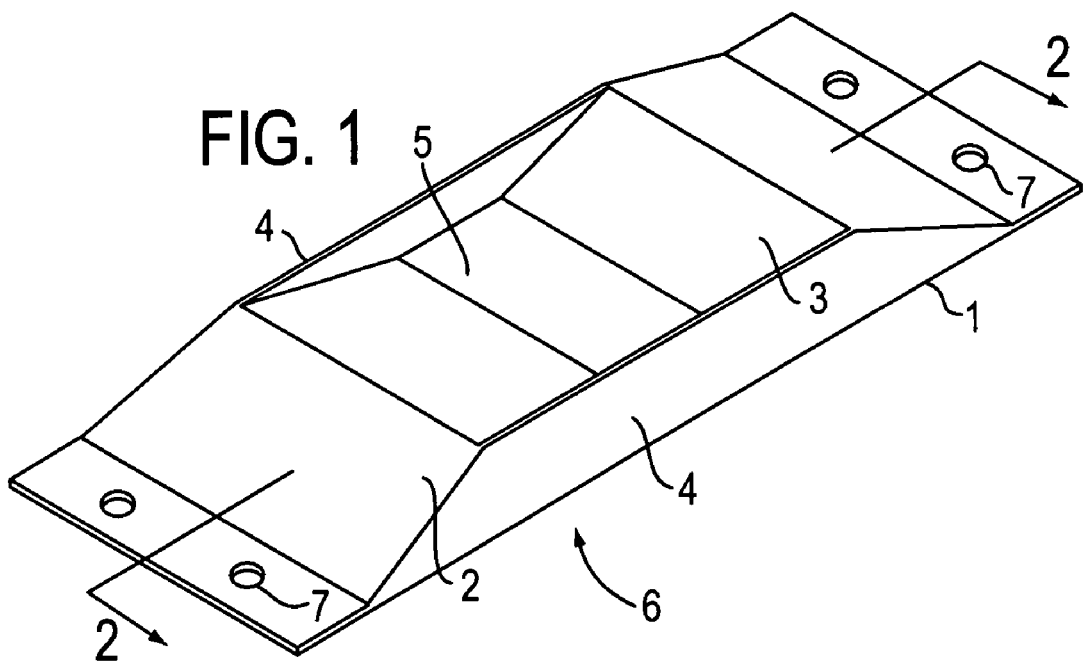

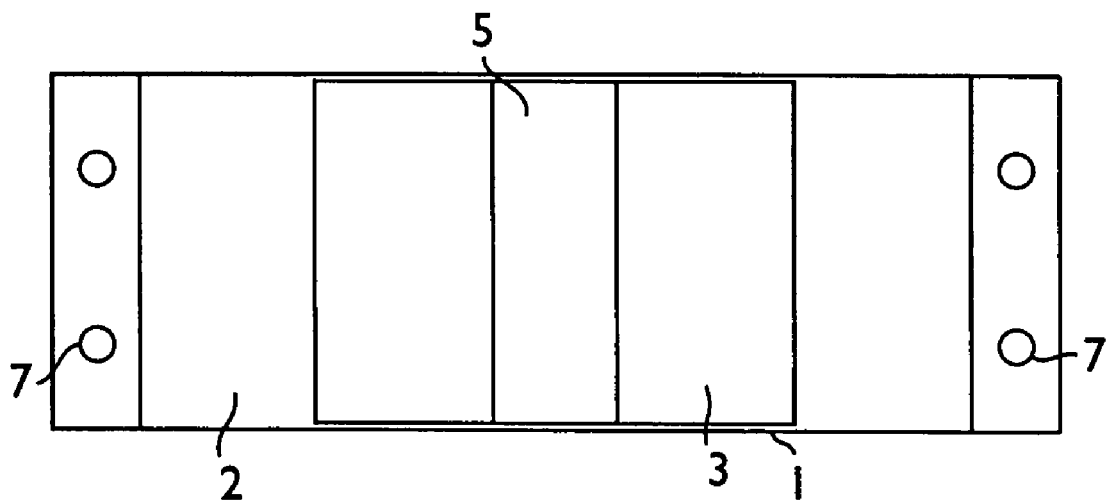
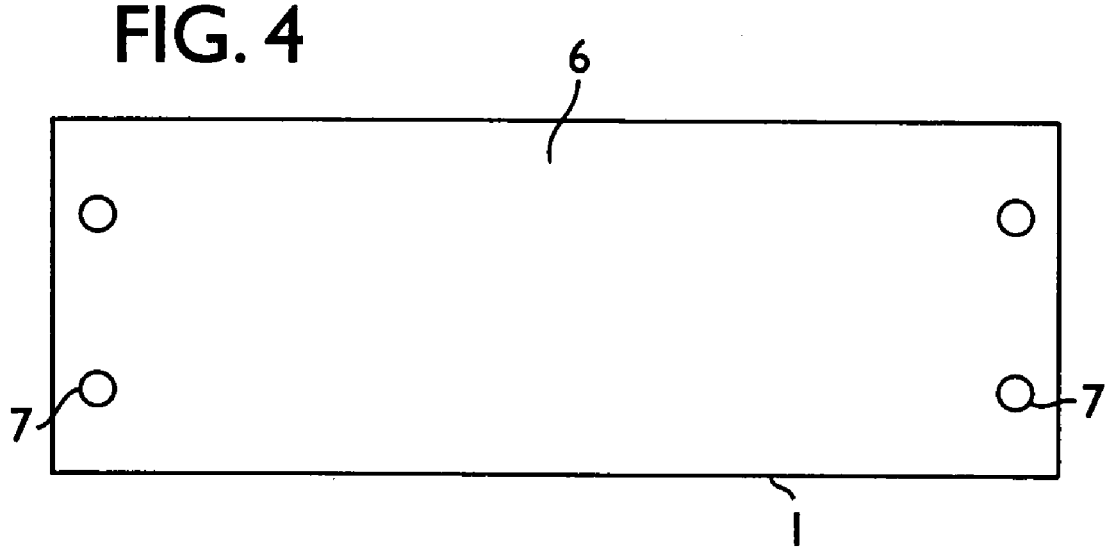

STOP FOR EQUIPMENT POSITIONING

BACKGROUND OF THE INVENTION

1. Field of the Invention

This invention relates to a stop to provide a method by which equipment can be stabilized in a fixed location.

2. Brief Description of the Prior Art

A number of types of chocks and stops for chocking the wheels of aircraft and motor vehicles have heretofore been provided. The devices used for that function have been more specifically designed for the use in immobilizing or arresting movement of vehicles along the ground, more particularly, aircraft and motor vehicles.

A problem which has not been solved by the chock construction previously employed is that of secure retention of commercial cooking equipment such that the equipment is located properly in a fixed location so that fire suppression systems will function as designed.

Equipment that comes with castor arrangements have sometimes been equipped with brakes which can be locked to apply a braking force to the castor wheel for deterring and preventing rotation of the wheel about its axle. However, such brakes are inadequate in the commercial cooking equipment setting as they do not provide a fixed location for the cooking equipment within the required area of the fire suppression system such that it will ensure that each time the cooking equipment is removed, it will be returned to the proper location from which it came.

SUMMARY OF THE INVENTION

A principle object of the invention is to provide a method by which commercial cooking equipment can be located in a fixed position.

Another object is to provide a stop for wheels that can be installed and positioned quickly and easily.

Another object is to provide a stop that ensures that the clearances required by the national fire prevention code or like codes are maintained.

Another object is to provide a stop which meets the sanitary requirements of the National Sanitary Foundation.

Another object is to provide a stop which is a reusable device that can be removed and relocated.

The foregoing objects can be accomplished by utilization of a stop for blocking the rolling movement of a wheel on equipment to prevent movement of the equipment. To this end, the stop comprises an integrally formed body having an upstanding ramped portion having opposing forwardly and rearwardly slopping surfaces for the passage of a wheel of equipment therealong. A recessed wheel reception portion positioned between the two ramped portions.

DETAILED DESCRIPTION OF THE INVENTION

The present invention is a stop for equipment positioning and is illustrated in the Figures and is broadly designated by the reference numeral 1. The stop is made of a rigid material and is of unibody construction. The entire structure may be washed or cleaned and meets the cleanliness standards set forth by the National Sanitary Foundation (NSF). The stop provides for exact positioning of equipment by immobilizing the wheels of equipment in conjunction with the securing of the stop by use of securing means. The inventions simplicity resides in ensuring that a wheel will be restrained within the stop during normal usage without the use of ties or securing means. The wheel is maintained within the stop wheel positioning area during normal use.

Figure 2:
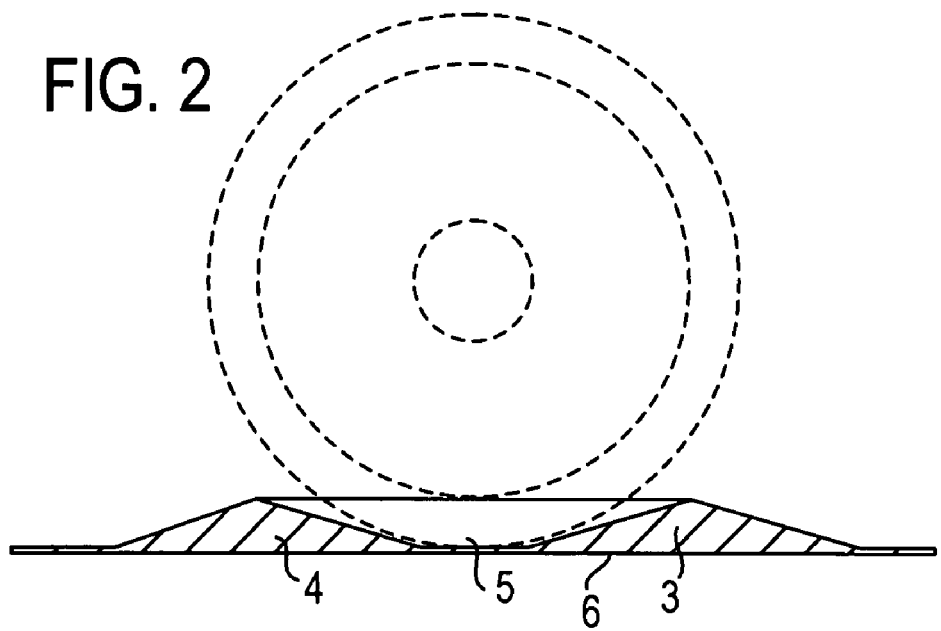

The stop has a body 1 that is adapted to receive different size wheels such as those present on a wide variety of equipment, especially kitchen equipment. The stop is also adaptable to hospital bedding and medical equipment. The preferred use is on a flat or level surface, but slight incline surfaces are possible. The stop is typically about (8-10) inches long and (2-4) inches wide. The stop comprises a front ramp 2 and rear ramp 3 portion, wheel support elements 4, and a wheel receiving area 5 portion located between the front and rear ramps and wheel support elements. The stops body 1 is preferably and generally of rectangular form and of low profile and adaptable to receive different size wheels such as those present on a wide variety of equipment. The middle portion of the stop has a wheel receiving portion 5 formed between wheel support elements 4, preferable parallel upright periphery walls or rails and of sufficient thickness and strength to supply a degree of rigidity to laterally support an equipment wheel as shown, and the frontwardly and rearwardly sloping ramp portions 2,3. As shown in FIG. 2, the spacing between the wheel support elements 4 and ramp portions 2,3 is sufficient to receive the wheel of a castor in the receiving portion with its axle extending transversely of and substantially perpendicular to the wheel support elements 4 to afford slight clearance between the opposite sides of the wheel and the respectively adjacent support elements 4.

The rear ramp 3 portion confines the wheels from moving beyond the wheel receiving portion 4 after the wheel has passed over the front ramp 2.

Additionally, the stop has a substantially flat bottom ground engaging surface 6. As shown in FIG. 2 by the dotted outline of a wheel, the ramp portions 2,3 permit the passage of a wheel to be received in the wheel receiving portion 5.

The stop 1 may also include securing means 7 formed integral therewith extending forwardly and opposite in direction from the front and rear ramps 2,3. The securing means are designed to maintain a flush arrangement to mate with the engaging surface.

Figure 5:
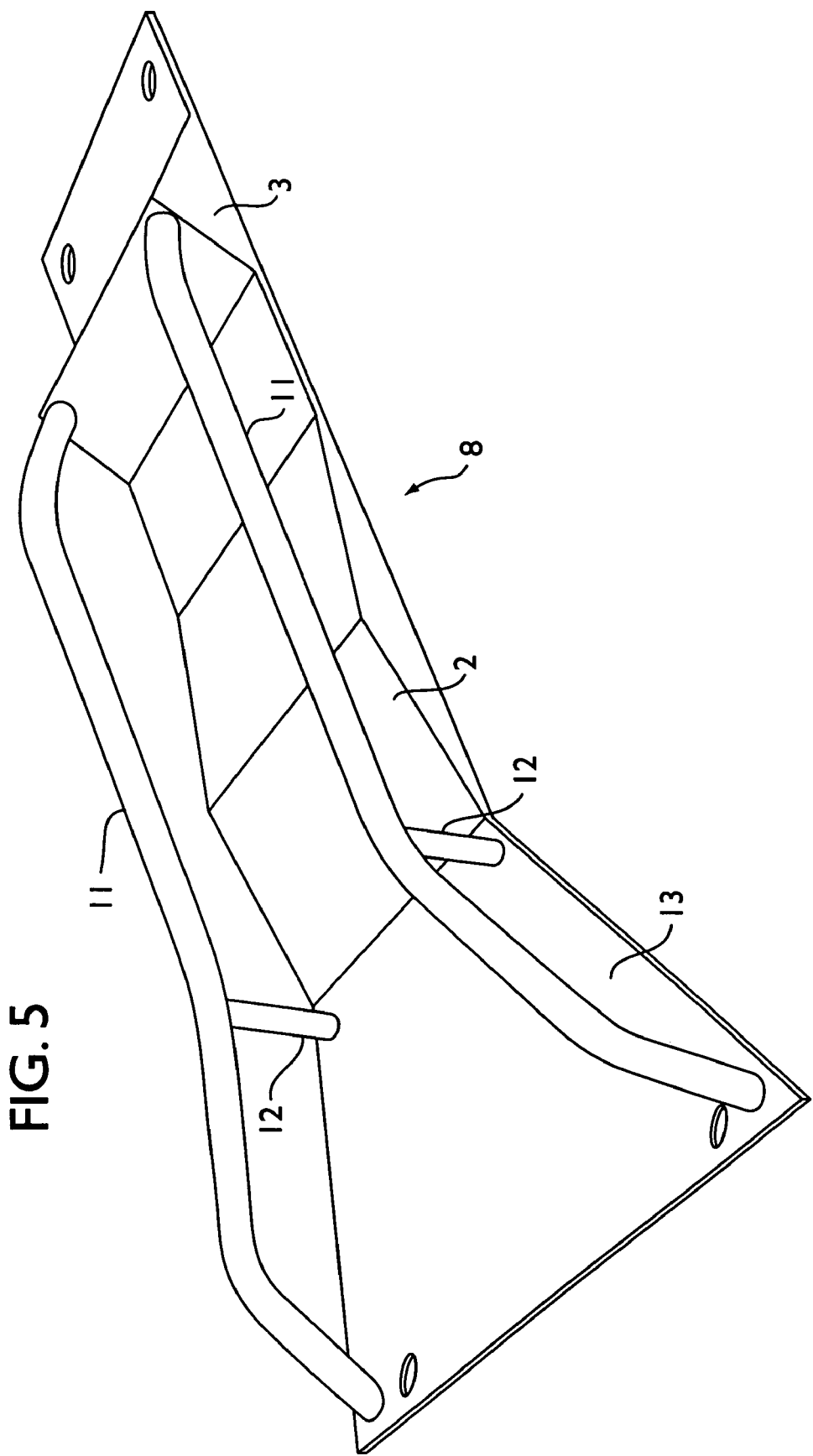

FIG. 5 shows the preferred embodiment of the stop 8. This embodiment is provided with a rear ramp of greater inclination 3 thereby acting as an abutment to prevent further wheel movement axially therealong and over the rear ramp. The wheel support elements are defined by rail-line members 11 that extend from and are secured to the front and the rear of the stop and are structurally supported therealong by a purity of beams 12 projecting from the upper surface of the stop and terminating at an integral with the rail-like members 11. A flared positioning aid 13 is provided to aid in the equipment wheel placement and projects outwardly and extends forward from the front ramp portion 2.

By this invention, the safety margin involved in meeting and maintaining placement tolerances and distances of equipment is enhanced. Cleanliness standards are easily achievable, especially in the preferred embodiment which make use of openings on lateral sides of the wheel receiving portion that allow easy removal of debris from the wheel receiving portion. Further, obstruction or adverse impact on other equipment, especially sensitive hospital tubing or apparatus, in the vicinity of the equipment being stabilized is minimized.

In the drawings and specification, there has been disclosed a preferred embodiment of the invention and, although specific terms are employed, they are used in a generic sense only and not for the purpose of limitation, the scope of the invention being set forth in the following claims.

What is claimed is:

1. The process of accurately locating wheeled commercial kitchen equipment to a predetermined location on a kitchen floor relative to a fixed fire suppression system and to prevent shifting of said wheeled commercial kitchen equipment relative to said fire suppression system during use and when said wheeled commercial kitchen equipment is removed for servicing and returned from servicing, thereby maintaining said wheeled commercial kitchen equipment within placement tolerances of the fixed fire suppression system in said kitchen, comprising:

mounting a ramped stop element on said kitchen floor to define said predetermined location relative to said fire suppression system, said ramped stop element confining a wheel on said wheeled commercial kitchen equipment therein, said ramped stop element including a first forwardly sloping surface, a first rearwardly sloping surface, a second forwardly sloping surface, and a wheel receiving portion between said first rearwardly sloping surface and said second forwardly sloping surface, rolling said wheel on said wheeled commercial kitchen equipment up said first forwardly sloping surface and down said first rearwardly sloping surface to be positioned securely by said wheel receiving portion between said first rearwardly sloping surface and said second forwardly sloping surface in said predetermined location in relation to said floor without use of ties or securing means, said stop element further including wheel support elements extending on lateral sides of said wheel receiving portion, said lateral sides further including openings for allowing removal of debris from the wheel receiving portion while the stop element is secured to the kitchen floor.

2. The process defined in claim 1 including guiding said wheeled commercial kitchen equipment to said predetermined location by flared surfaces in advance of said forwardly sloping surface of said ramped stop element.

3. The process defined in claim 1 wherein said second forwardly sloping surface has a greater slope than said first rearwardly sloping surface.

4. The process of accurately locating wheeled commercial kitchen equipment to a predetermined location on a kitchen floor relative to a fixed fire suppression system and to prevent shifting of said wheeled commercial kitchen equipment relative to said fire suppression system during use and when said wheeled commercial kitchen equipment is removed for servicing and returned from servicing, thereby keeping said wheeled commercial kitchen equipment within placement tolerances of the fixed fire suppression system in said kitchen, comprising:

positioning a pair of ramped stop elements on said kitchen floor to define said predetermined location relative to said fire suppression system, each said ramped stop element confining a respective wheel therein, each said ramped stop element including a first forwardly sloping surface, a first rearwardly sloping surface, a second forwardly sloping surface, and a wheel receiving portion between said first rearwardly sloping surface and said second forwardly sloping surface, rolling a pair of wheels on said wheeled commercial kitchen equipment up said first forwardly sloping surfaces on said pair of ramped stop elements and down said first rearwardly sloping surfaces to be positioned securely by respective said wheel receiving portions between said first rearwardly sloping surfaces and second said forwardly sloping surfaces in said predetermined location in relation to said floor without use of ties or securing means, said stop elements further including wheel support elements extending on lateral sides of said wheel receiving portion, said lateral sides further including openings for allowing removal of debris from the wheel receiving portions while the stop elements are secured to the kitchen floor; and guiding said pair of wheels on said wheeled commercial kitchen equipment to said predetermined location by flared surfaces in advance of said forwardly sloping surfaces on said pair of ramped stop elements.

5. The process of accurately locating wheeled commercial kitchen equipment to a predetermined location on a kitchen floor relative to a fixed fire suppression system and to prevent shifting of said wheeled commercial kitchen equipment relative to said fire suppression system during use and when said wheeled commercial kitchen equipment is removed for servicing and returned from servicing, thereby keeping said wheeled commercial kitchen equipment within placement tolerances of the fixed fire suppression system in said kitchen, comprising:

providing a pair of ramped stop elements on said kitchen floor to define said predetermined location relative to said fire suppression system, each said ramped stop element confining a wheel on said wheeled commercial kitchen equipment therein, each said ramped stop element including a first forwardly sloping surface, a first rearwardly sloping surface, a second forwardly sloping surface, and a wheel receiving portion between said first rearwardly sloping surface and said second forwardly sloping surface, rolling a pair of wheels on said wheeled commercial kitchen equipment up respective said first forwardly sloping surfaces on respective ones of said ramped stop elements and down said first rearwardly sloping surfaces, to be positioned securely by respective said wheel receiving portions between said first rearwardly sloping surfaces and second said forwardly sloping surfaces in said predetermined location in relation to said fixed fire suppression system without use of ties or securing means, said stop elements further including wheel support elements extending on lateral sides of said wheel receiving portion, said lateral sides further including openings for allowing removal of debris from the wheel receiving portions while the stop elements are secured to the kitchen floor; and guiding said wheeled commercial kitchen equipment to said predetermined location by flared surfaces in advance of said forwardly sloping surfaces of said pair of ramped stop elements, respectively.

\* \* \* \* \*